March 26, 1963    D. F. SALMON ETAL    3,083,010
BLUEPRINT FOLDING MACHINE
Original Filed Dec. 14, 1959    10 Sheets-Sheet 1

INVENTORS.
DAVID F. SALMON
JOE T. ZINN
BY
ATTORNEYS.

March 26, 1963   D. F. SALMON ETAL   3,083,010
BLUEPRINT FOLDING MACHINE
Original Filed Dec. 14, 1959                    10 Sheets-Sheet 2

INVENTORS.
DAVID F. SALMON
JOE T. ZINN
BY
ATTORNEYS.

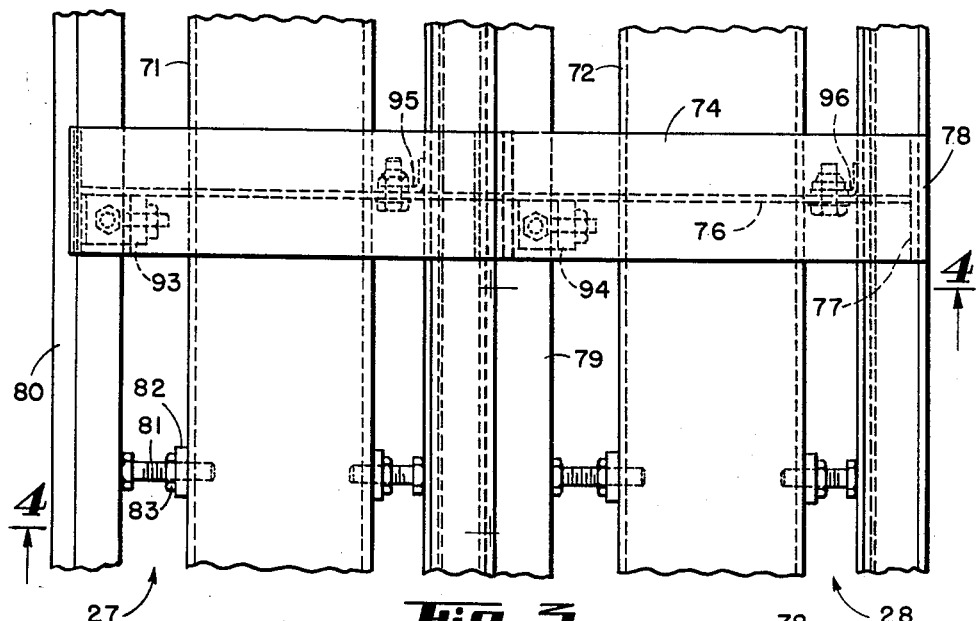
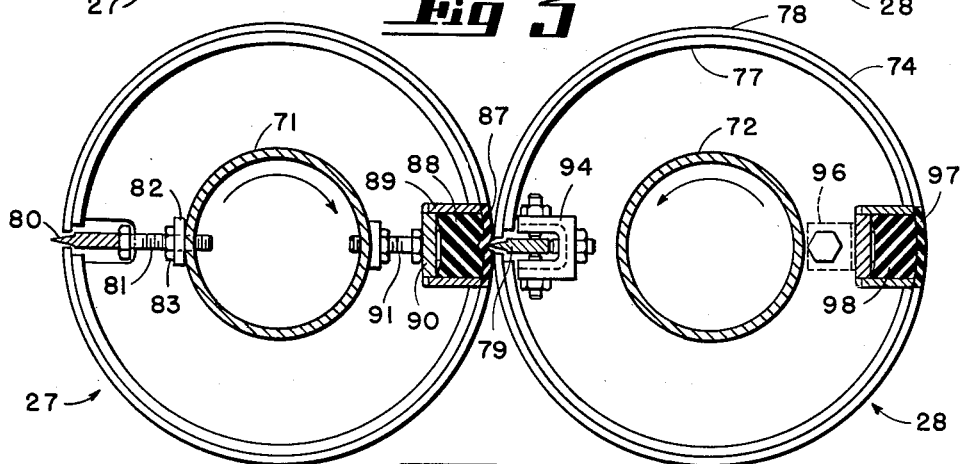
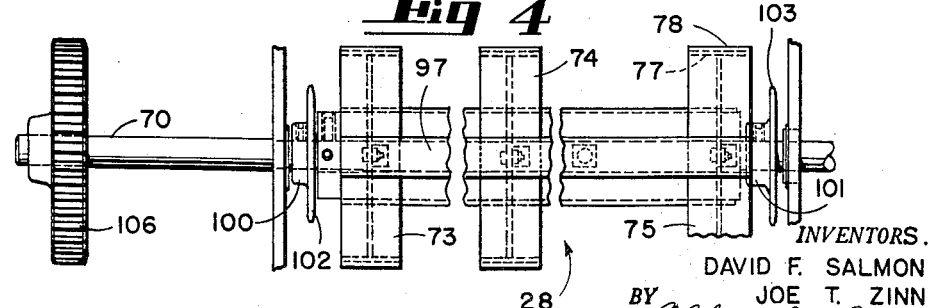

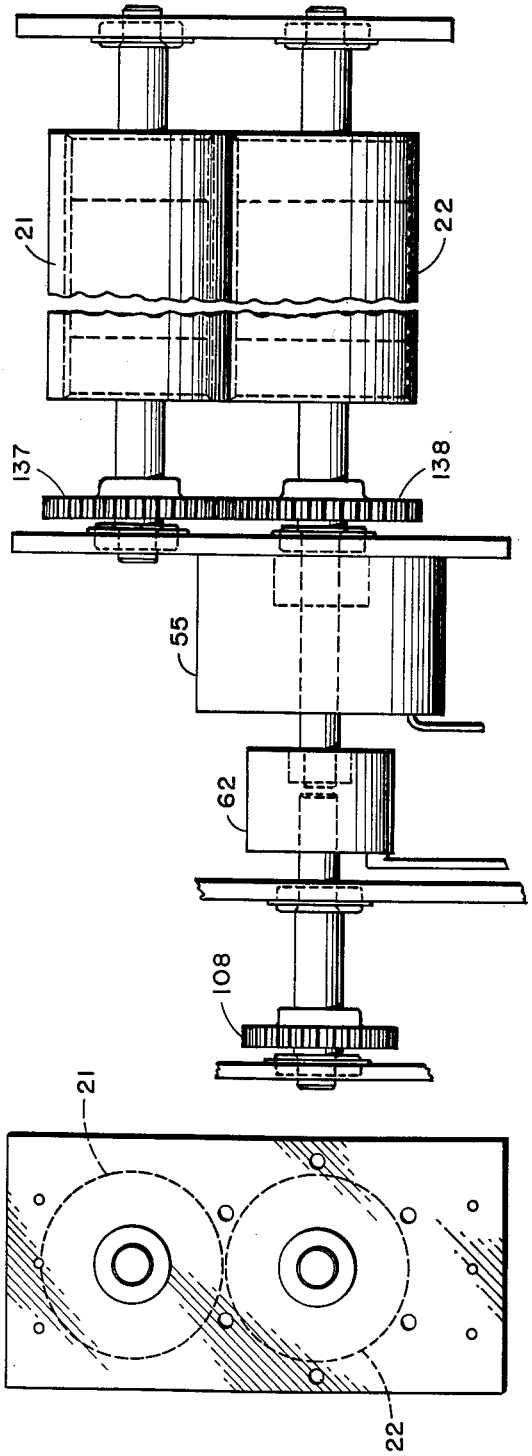

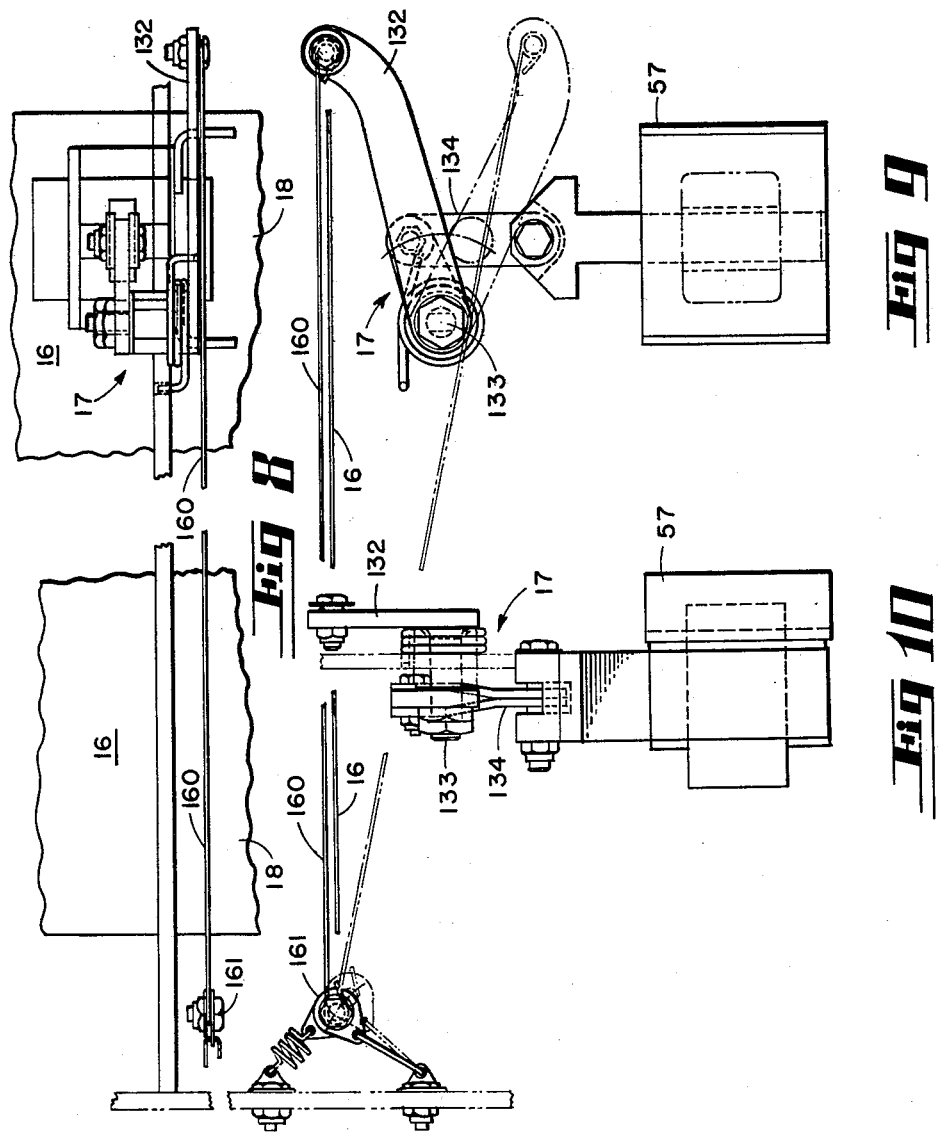

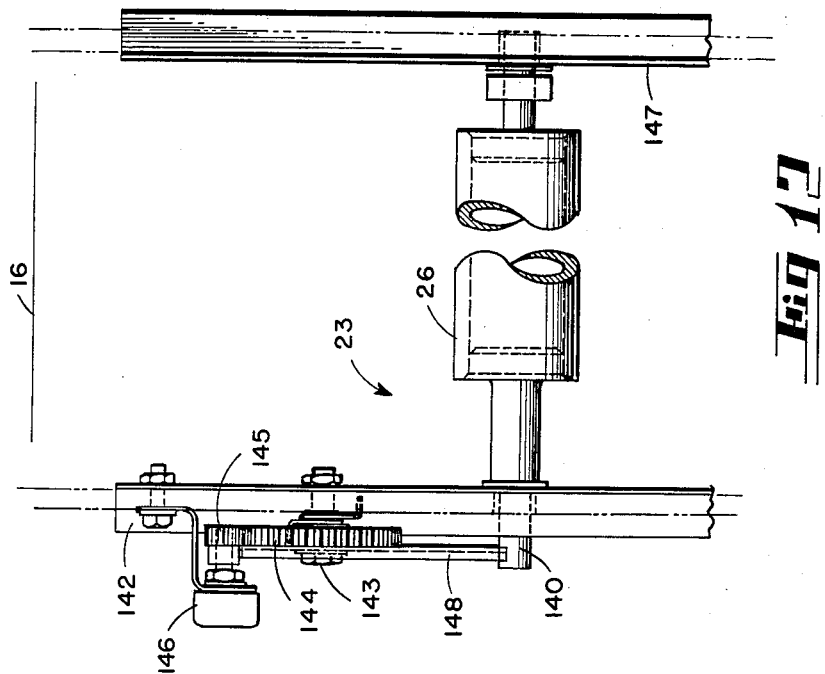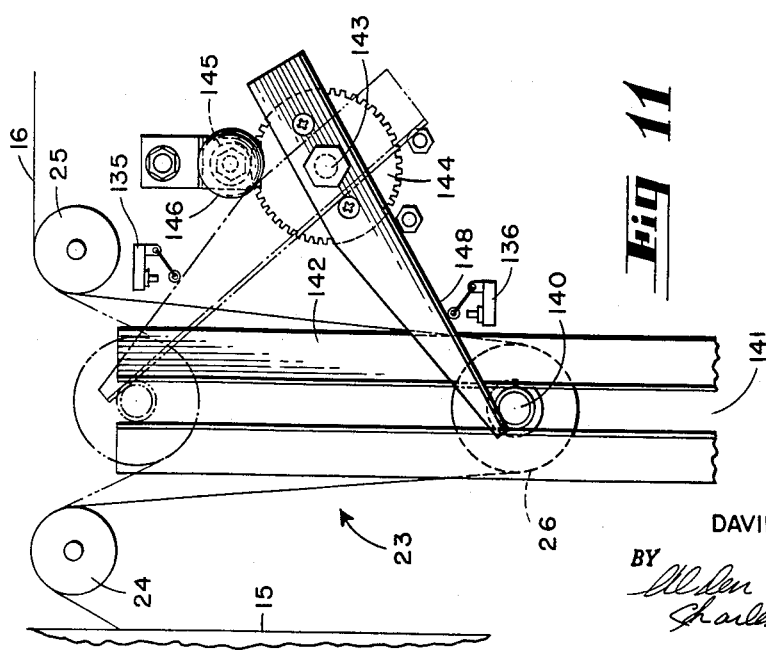

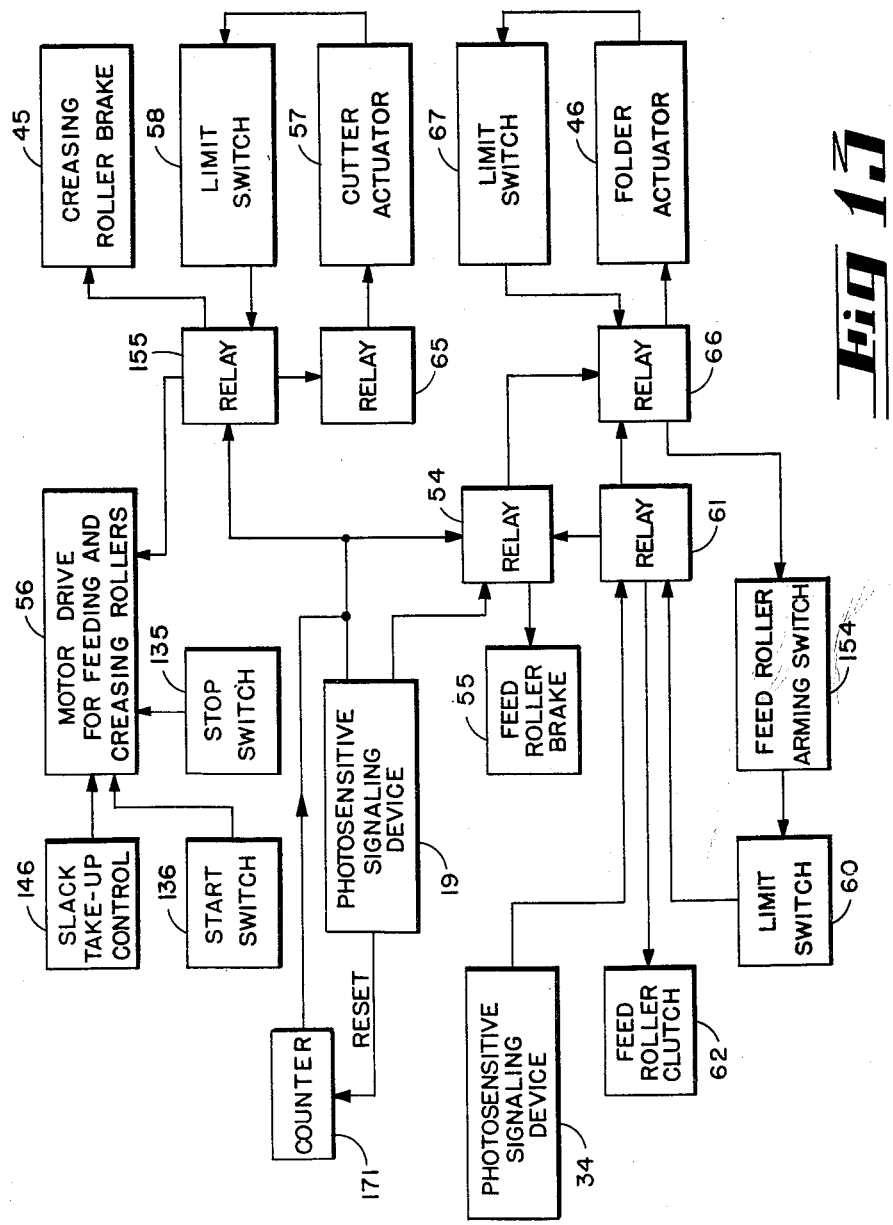

March 26, 1963 D. F. SALMON ETAL 3,083,010
BLUEPRINT FOLDING MACHINE
Original Filed Dec. 14, 1959 10 Sheets-Sheet 10
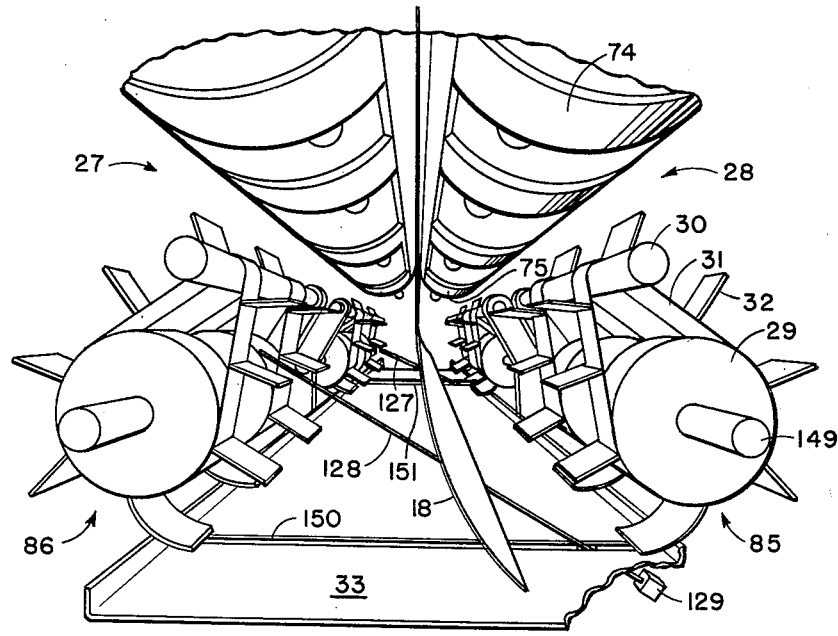
Fig 16
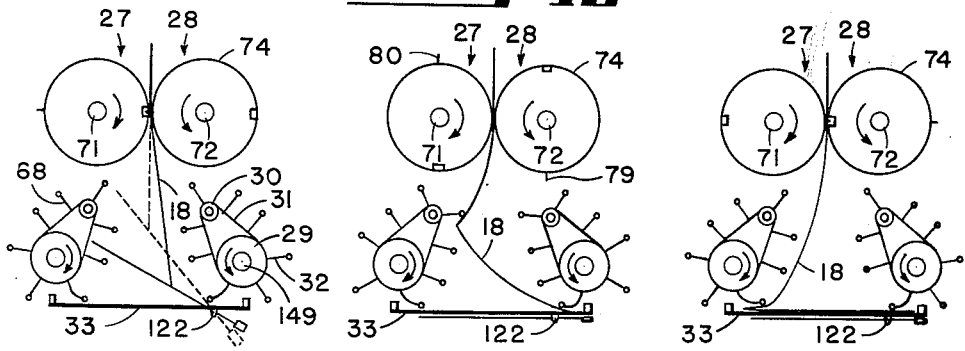
Fig 17  Fig 18  Fig 19
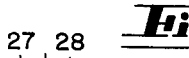
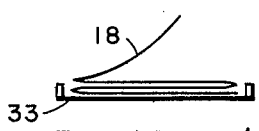
Fig 20  Fig 21
INVENTORS.
DAVID F. SALMON.
JOE T. ZINN.
BY Alden D. Redfield
Charles M. Hogan
ATTORNEYS.

United States Patent Office
3,083,010
Patented Mar. 26, 1963

3,083,010
BLUEPRINT FOLDING MACHINE
David F. Salmon, Nashville, Tenn., and Joe T. Zinn, Englewood, Colo., assignors to Avco Corporation, Nashville, Tenn., a corporation of Delaware
Continuation of application Ser. No. 859,360, Dec. 14, 1959, now Patent No. 3,048,389, dated Aug. 7, 1962. This application May 16, 1962, Ser. No. 195,119
9 Claims. (Cl. 270—62)

The present invention relates to blueprint folding machines and provides the controls for a novel machine which transforms the continuous output of a blueprint machine into a plurality of compact prints or work units in double cross-folded accordion form.

The present patent application is a continuation of our United States patent application Serial No. 859,360, filed December 14, 1959, now U.S. Patent No. 3,048,389, entitled "Blueprint Folding Machine" and assigned to the same assignee as the present application and invention.

It is an object of the invention to provide a control system for a blueprint folding machine which cooperatively accepts the output of a blueprint machine and transforms the same into a plurality of double cross-folded accordion prints.

The parent patent application discloses an arrangement, in a blueprint folding machine, for forming a sheet or work unit of blueprint into an accordion, comprising: a tray 33 (FIGS. 1, 2, and 14–16); creasing means 28 and 27 (FIGS. 1–5 and 16) for creasing the work unit 18 while feeding it into the tray in a loose accordion form having opposite folds (FIGS. 17–20); a pair of spaced stacking means 85 and 86 (FIGS. 1, 2, 16, and 17), said stacking means being formed with first and second groups of resilient wipers (one of the first group being designated 32 in FIG. 17, and one of the second group being designated 68); and means 56, 109, 108, 106, 70, 102, 103, 104, and 105 (FIGS. 1, 5, and 15) for driving the stacking means so that the groups of wipers flatten and secure opposite folds of the accordion form as that form is deposited on the tray.

The parent patent application further discloses a machine for forming a blueprint sheet into a pleated and double cross-folded work unit, comprising: means 21 and 22 (FIGS. 1 and 2) for feeding a work unit 18 from a continuous supply 16, means 17 (FIGS. 2 and 8–10) for severing its trailing edge from the continuous supply, means (shown in FIGS. 16–20) extending transversely of the work unit for forming the same into a pleated accordion, means 34 and associated elements (FIGS. 1, 2, and 13) for indicating the completion of the pleating operation, and means 36, 39 and 50 and associated elements (FIGS. 1, 14, and 15) for double cross-folding the accordion.

The primary object of the invention is to provide, in a blueprint folding machine, the combination of: creasing means for forming a work unit into an accordion, means including feed rollers for supplying blueprint to the creasing means, motor means for driving said feed rollers and said creasing means, a clutch between the driving motor and the feed rollers, a brake for the feed rollers, a brake for the creasing means, a first light-sensitive means for indicating that the leading edge of a second work unit is approaching the feeding means, first relay means responsive to said first light-sensitive means for applying the feed roller brake, second relay means responsive to said first light-sensitive means for applying the brake for the creasing means and disabling the motor, cutting means responsive to the second relay means for severing the first work unit, and means responsive to the action of the cutting means for resetting the second relay means.

For a better understanding of the present invention, together with other and further objects, advantages, and capabilities thereof, reference is made to the following description of the accompanying drawings, in which:

FIG. 2 is a schematic and skeletonized outline of the principal elements of the FIG. 1 embodiment, showing them generally in side elevational view, this figure being provided for the purpose of explaining a typical mechanical cycle of operation of our novel blueprint folding machine;

FIG. 3 is a fragmentary top plan view of the first and second creasing roller means which are utilized to press each work unit into a pleated or accordion-like form;

FIG. 4 is a sectional view taken along line 4—4 of FIG. 3 and looking in the direction of the arrows;

FIG. 5 is a front view of the creasing roller 28 and associated parts;

FIG. 6 is a top plan view, partially broken away, showing the feeding rollers and associated parts;

Figure 1:
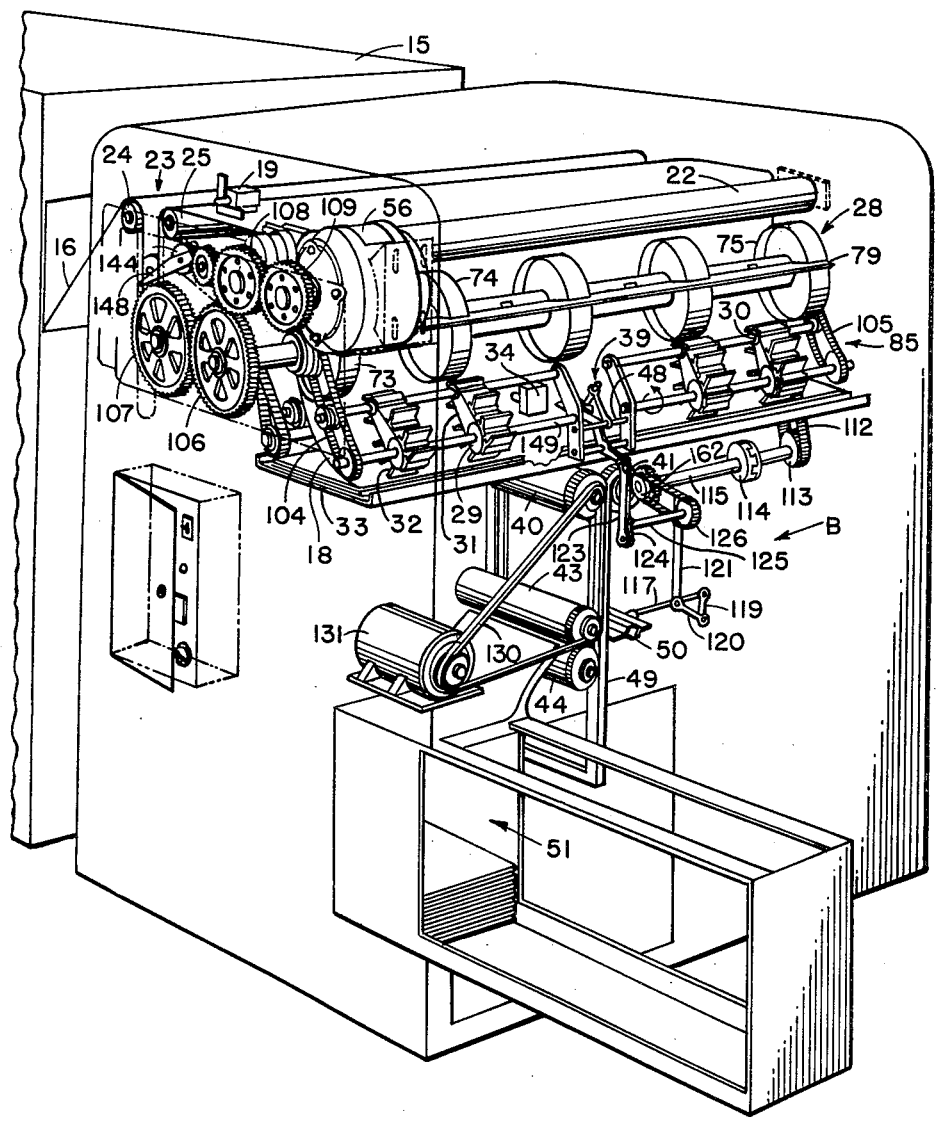
FIG. 1 is a perspective view of a preferred embodiment of the blueprint folding machine having controls in accordance with the invention, this view being taken from the frontal aspect, the back of the machine being the portion adjacent the blueprint supply machine 15.
Figure 7:
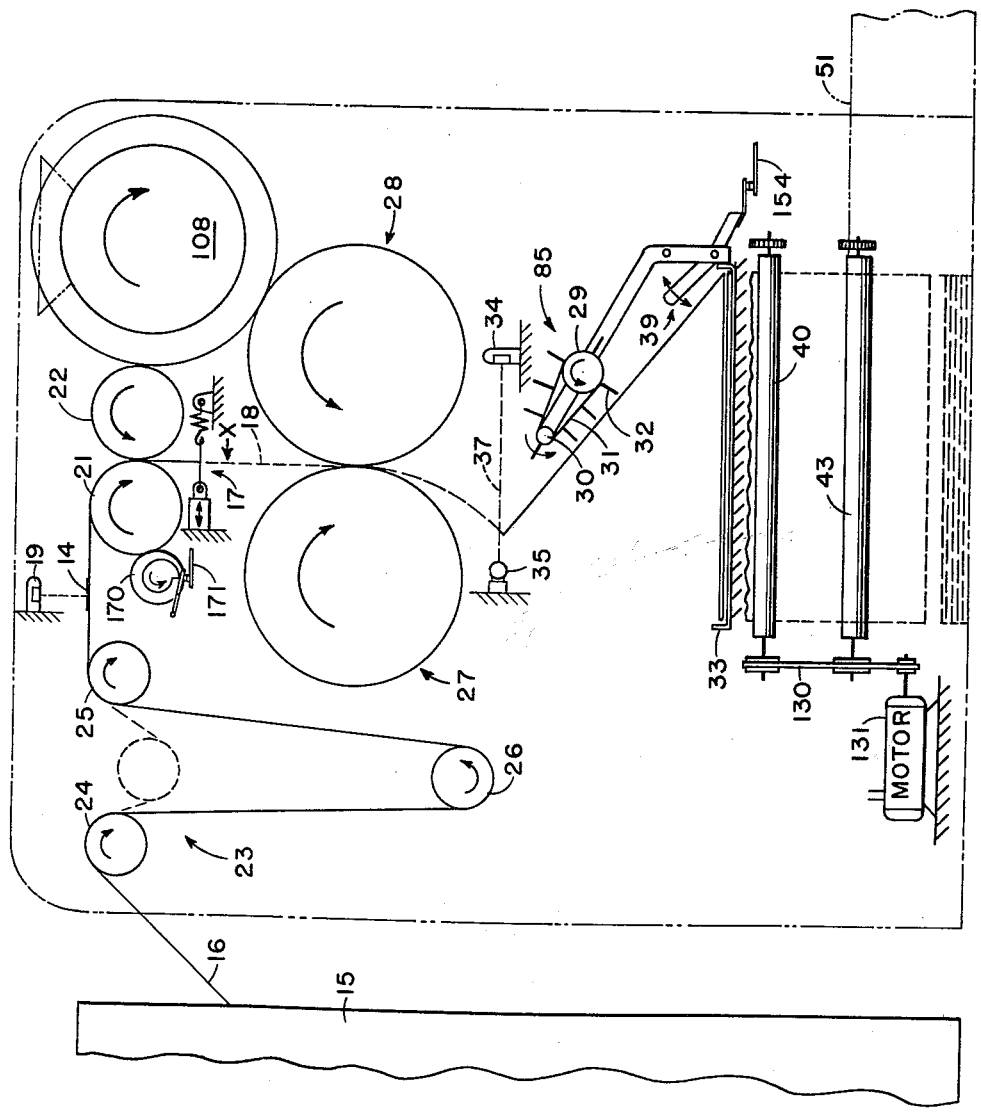
FIG. 7 is a side elevational view of the feed roller subassembly.
Figure 14:
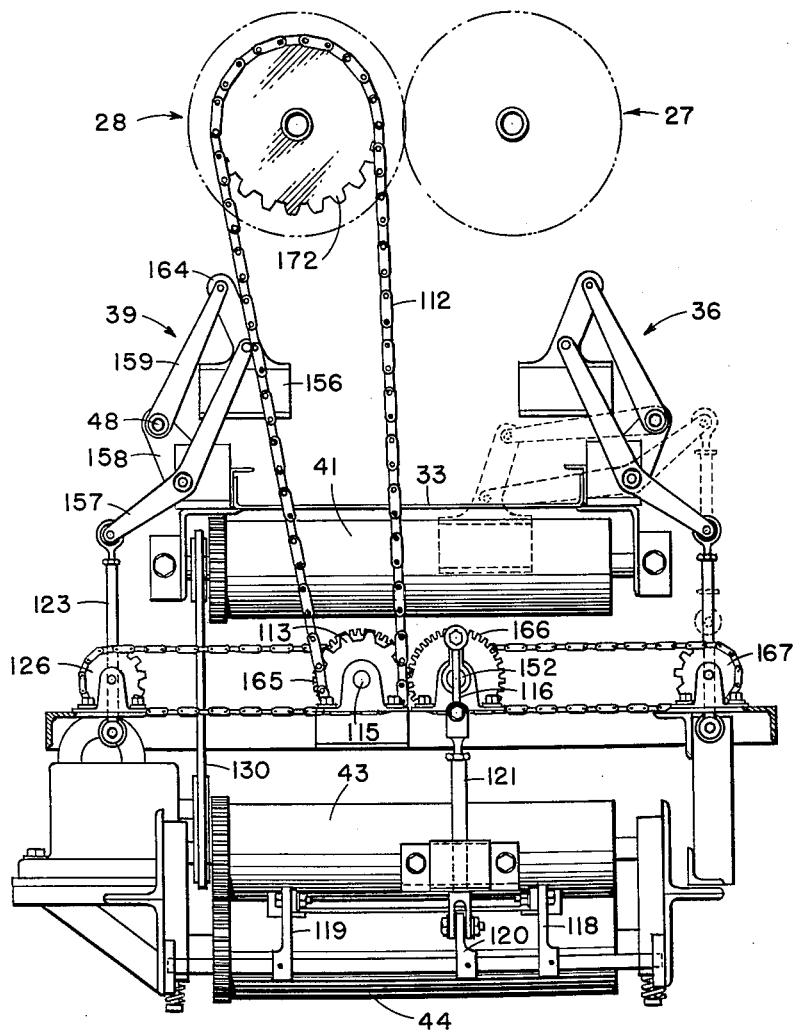
Figure 15:
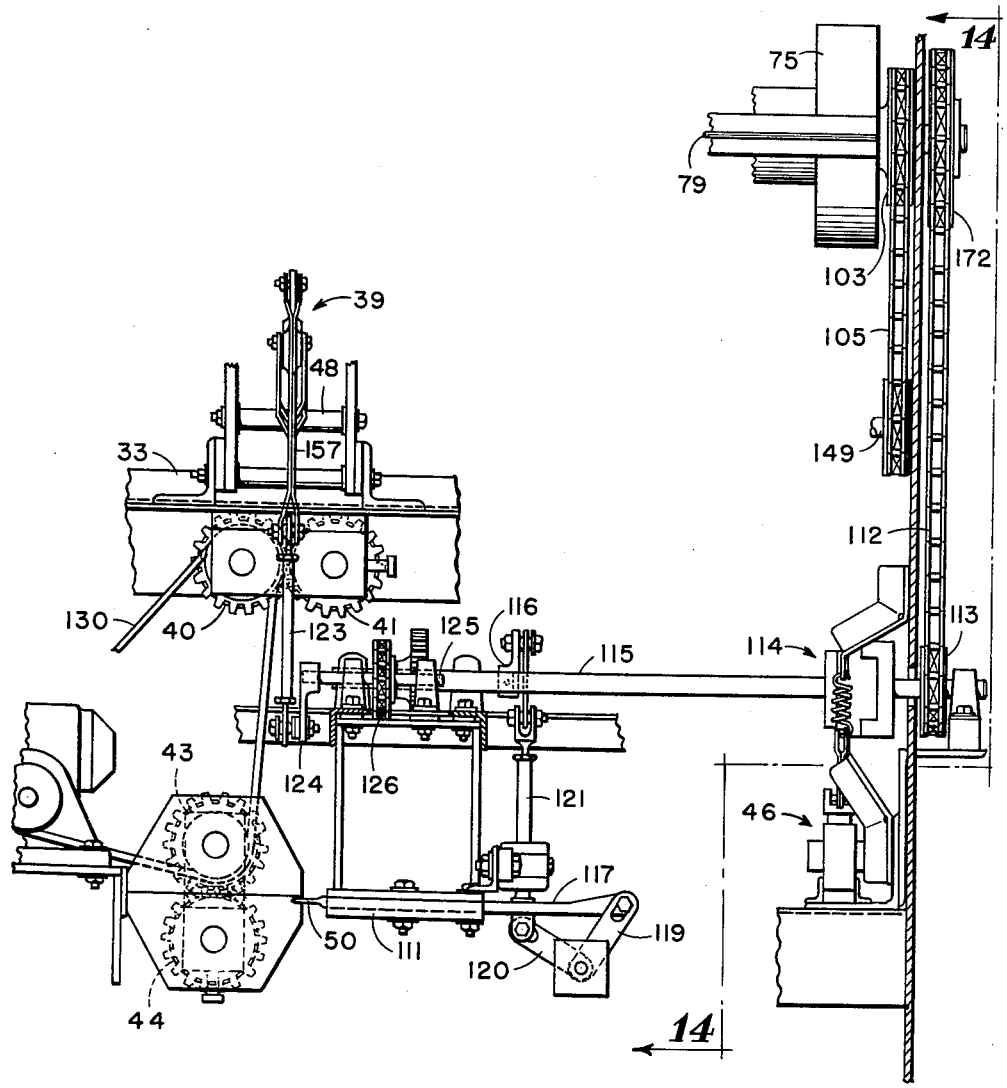

FIGS. 8, 9, and 10 are top plan, front, and side elevational views, respectively, of the cutting mechanism which severs each work unit from the continuously fed output of the supply machine, it being understood that the top plan view of this mechanism per se shows the mechanism as it appears as viewed in the direction indicated by the arrow X in FIG. 2, the cutting mechanism being installed so that the cutting wire 160 is immediately in front of a downwardly extending portion of the blueprint supply 16;

FIGS. 11 and 12 are side and front views, respectively, of our novel slack take-up device;

FIG. 13 is a block diagram of a preferred form of electrical control system in accordance with the invention;

FIG. 14 is a side view of the double cross-folding mechanism included in our novel blueprint folding machine as viewed in the direction indicated by the arrow B in FIG. 1;

FIG. 15 is a front view of the double cross-folding mechanism;

FIG. 16 is a side or profile view of the novel stacking mechanism featured in the FIG. 1 embodiment;

FIGS. 17, 18, 19, and 20 are skeletonized views of the stacking mechanism showing various phases of its cycle of operation; and FIG. 21 is a profile view showing the accordion form into which each blueprint work unit is pleated.

Referring now specifically to FIGS. 1 and 2, there is shown a conventional blueprint machine 15 (FIG. 1), the continuous blueprint output of which (referred to as "the supply") is numbered 16. This continuously supplied print is periodically sheared off by a cutter 17 (FIG. 2), and the blueprint portion below cutter 17 (as shown in FIG. 2) is hereinafter referred to as the "first work unit." Cutter 17 is automatically operated by relay devices hereinafter described, in response to a signal generated by phototube 19 (FIG. 2). The photosensitive device 19 senses a reference mark 14 on the supply print 16. Reflected light from the reference mark causes the device 19 to produce a signal which indicates that the processing of the first work unit should be completed. Reference mark 14 is located on the supply and is displaced from the trailing edge point of the first work unit by a predetermined amount. Reference mark 14 is near the leading edge of the second work unit.

The blueprint supply is threaded into the machine by first and second feed rollers 22 and 21, and these feed rollers are stopped immediately before the cutting means 17 performs its operation. Further, feed rollers 22 and 21 remain stopped until the pleating and first cross-folding operations on the first work unit have been completed.

In order to provide for the stopping of feed rollers 22 and 21, the feed rollers are provided with a brake 55 and a clutch 62 (FIGS. 6 and 13). The brake 55 is applied and the clutch 62 is opened, by means hereinafter described, thereby arresting the movement of the feed rollers and uncoupling the feed rollers from the driving elements 108, 109, and 56 (FIGS. 1 and 6).

After the pleating operation, which is performed by the mechanism illustrated in FIG. 16, including creasing means 28, 27 (FIG. 2), and the first cross-folding operation, performed by means 36 and 39 (FIGS. 1, 2, and 14), the feed rollers 21 and 22 are restarted, and they continue to run until just before the following or second work unit is severed. It will be seen, therefore, that the function of the feed rollers is to feed out each work unit to the creasing mechanism, preparatory to the pleating operation, and to hold the leading edge of the second work unit stationary during the last stage of the pleating operation on the first work unit.

One of the advantages of the present invention resides in the fact that, while the feed rollers 21 and 22 are periodically braked and held stationary, the supply machine 15 continues to run. This advantage is achieved by reason of the automatic operation of the slack take-up device generally indicated at 23 (FIGS. 2, 11, and 12). It comprises a pair of idler rollers 24 and 25, the axis of rotation of each of which is fixed, and a floating idler roller 26, the axis of rotation of which is automatically varied in relation to the amount of slack to be taken up.

Having generally described the feeding and slack take-up mechanisms which feed work units to the pleating apparatus, unit by unit, while permitting continuity of operation of the supply machine, the description proceeds to the sequence of forming operations on the first work unit, for example. Among the features of the invention is a novel arrangement for performing the first forming operation: i.e., placing the successive work units into accordion form. This novel arrangement comprises a tray 33 (FIGS. 1, 2, and 14–16), together with first and second creasing roller means 28 and 27 (FIGS. 1–5 and 16) which are located above the tray for creasing the work unit while feeding it in loose accordion form into the tray. Creasing roller means 28 is formed with a first longitudinal depression (i.e., the depression permitted by elastic elements 97—98, FIG. 4) and a first diametrically opposed longitudinal projection 79 (FIG. 4). The other creasing roller means 27 is formed with a second longitudinal projection 80 (FIG. 4) and a second diametrically opposed longitudinal depression (permitted by elastic elements 87—88, FIG. 4). The creasing means 28 and 27 are driven by gears 106 and 107 and are disposed with their axes parallel to the width of the work unit 18, which is threaded and compressed therebetween. Gear 106 is driven by gear 108, which is in turn driven by gear 109. Motor 56 drives gear 109. The creasing means rotate and form the work unit into an accordion or pleated shape, the edge of each pleat extending widthwise of the print. The basic operation of our improved creasing means will be understood by reference to literature relating to devices for forming successive bends and reverse bends, such as U.S. Patent 2,414,681 to Whalen, issued January 21, 1947.

The work unit 18 is compressed between the first projection 79 and the second depression 87 (FIGS. 4 and 17) to make the first alternate folds of the accordion form, which converge toward the left, as shown in FIG. 18. As the work unit continues to be threaded through the creasing roller means, it is compressed between the second projection 80 and the first depression 97 (FIGS. 4 and 19) to make the second alternate folds of the accordion form, each of which converges toward the right (as shown in FIG. 20).

It has been shown how alternate folds of the work unit are successively gravitationally fed to the tray 33.

The invention provides first and second stacking roller means 85 and 86 (FIGS. 1, 2, 16, and 17). The stacking roller means effectively comprises rollers located on opposite sides of the tray. For example, the first stacking roller means consists of a plurality of sub-rollers 29 and pulleys 30, which drive a like plurality of continuous belts such as 31. At the end of each belt 31 opposite sub-roller 29 is a pulley 30. The sub-rollers 29 are mounted on a shaft 149 which is suitably driven by means hereinafter described. The stacking means 86 is similar in operation and construction to the stacking means 85. To provide room for the cross-folding mechanism 39, the first stacking roller means 85 is divided into synchronized sections with two sub-rollers 29 being provided in each section. Stacking means 86 is similarly arranged.

The stacking roller means are provided with first and second groups of resilient wipers (a representative one of the first group being designated 32 in FIG. 17, and a representative one of the second group being designated 68). The stacking rollers are driven by means 56, 109, 108, 106, 70, 102, 103, 104, and 105 (FIGS. 1 and 5) in synchronism with the creasing roller means, in such a manner that the groups of wipers bend and wipe the opposite folds of the accordion form as the work unit is deposited on the tray (as shown in FIGS. 17–20). FIG. 18 shows how the leading edge of the work unit 18 is led under the first group of wipers, and that group, by reason of the counterclockwise rotation of stacking means 85, secures that edge while the second group of wipers, moving clockwise, engages the first fold of the accordion and aids in moving it from the position shown in FIG. 18 to that shown in FIG. 19. Thereafter the groups of wipers alternate in securing the alternate folds of accordion form in a defined stack, FIG. 20 showing the conditions which exist when the first group of wipers is almost ready to engage the second fold.

Referring now successively to FIGS. 17 and 18, it will be seen that the leading edge of the work unit is led to a position under the first group of wipers by deflecting means provided in accordance with the invention. The deflecting means comprises pivotally mounted rods 127 and 128, which are counterbalanced as indicated at 129 (FIG. 16). A suitable pivot 122 is schematically illustrated in FIG. 17. The deflecting elements 127 and 128 extend diagonally upwardly and across the tray in the same general direction as the first longitudinal projection (i.e., element 79, FIGS. 4 and 17). That is to say, the first longitudinal projection being pointed to the left as shown in FIG. 17 to make the first fold, then the deflecting elements 127 and 128 should extend upwardly and to the left when in their normal or rest position. As the rods are weighted down by the work unit, they swing into parallelism with the tray 33, as illustrated in FIG. 18, whereby the leading edge of the work unit is led under the first group of wipers.

The tray 33 is slotted as shown at 150 and 151 to provide for acceptance of the rods 128 and 127 as they swing into positions substantially flush with the tray.

The system is so arranged and timed that the creasing rollers are appropriately positioned to assure that when the feed rollers are restarted, the first fold will be of the type illustrated in FIG. 18.

Having described the mechanism which performs the pleating operation, reference is again made to FIG. 2. As the final fold of the first work unit is deposited on tray 33, the lagging edge of that work unit passes zone 37 and permits light from source 35 to impinge on a second photosensitive means 34. At this time the work unit is in accordion form and is on tray 33, whereupon the phototube 34 initiates the first cross-folding operation through controls later described herein. The first cross-folding device comprises a pair of swing-arm type tucking devices 36 and 39 (best shown in FIG. 14 and illustrated in whole or part also in FIGS. 1, 2, and 15). The purpose of these tucking devices is to push the accordion symmetrically between a pair of rollers 40 and 41. These rollers are arranged in a manner similar to the rollers in a wringer, so that when the tucking devices 36 and 39 press the accordion between the rollers, the rollers cross-fold the accordion and deliver it to a slide or frame 49. Various cross-folding devices are per se described in the literature. See, for example, U.S. Patent 2,106,953 to Ludewig, issued February 1, 1938. As best shown in FIGS. 1 and 14, the first cross-folding rollers 40 and 41 are geared together, and they are driven by a motor 131, via a chain belt 130, which engages a sprocket on the end of roller 40.

Tucking device 39 is representative, and device 36 is generally similar. Device 39 comprises a tucking element 156 which is adapted to be elevated and depressed by an arm 157, which in turn is angularly positioned by a connecting rod 123. Tucking element 156 is stabilized and maintained in proper angularity by a parallelogram type linkage comprising elements 158, 159, and 164 (FIG. 14).

The connecting rod 123 is elevated or depressed by a crank 124, which in turn is turned by a shaft 125 (FIG. 1). Shaft 125 is driven by a chain and sprocket mechanism 126, which in turn is driven by a sprocket 162 (FIG. 1). Sprocket 162 is secured to the end of shaft 115, and shaft 115 is driven—through a single revolution clutch 114—by a sprocket 113. This sprocket in turn is driven by belt 112, and that belt is driven by a gear in the creasing roll system (FIG. 14).

Adjacent sprocket 162 (FIG. 1) and also on shaft 115, is a gear 165 (FIG. 14) which meshes with a similar gear 166 to drive a sprocket (not shown; similar to sprocket 162, FIG. 1). The last-mentioned sprocket drives a chain and sprocket mechanism 167, similar to chain and sprocket mechanism 126, in order to actuate the tucking device 36.

From the foregoing, it will be understood that when single revolution clutch 114 (FIGS. 1 and 15) is engaged, the first cross-folding device goes through one cycle of operation, actuating the tucking devices 36 and 39, folding the accordion work unit, and feeding it into slide or frame 49.

The second cross-folding apparatus comprises rollers 43 and 44 (FIGS. 1 and 14) mounted with their axes in the same vertical plane and parallel to frame 49, centrally of frame 49. When a blueprint work unit is tucked between these two rollers, they perform the second cross-folding operation. The tucking is done by a thrust member 50 slidably mounted in a suitably machined framework 111 (FIG. 15). Element 50 is driven by a linkage comprising arm 117, links 118—119 and 120 (these three being fixed together as a unit), and connecting rod 121, and the connecting rod is depressed or elevated by crank 116 (FIG. 15) on shaft 152 (FIG. 14). The machine is so timed that when the tucking devices 36 and 39 perform their tucking operation on a given work unit, thrust member 50 performs its tucking operation on a preceding work unit.

When a cross-folded accordion is positioned in frame 49, thrust member 50 strikes it centrally and forces it between rollers 43 and 44, so that it is cross-folded for the second time and discharged into a tray 51, disposed near and below the second cross-folding device. The rollers 43 and 44 are geared together and driven by belt 130 as shown in FIG. 1.

From the foregoing, it will be understood that rollers 40, 41, 43, and 44 are continuously driven, through belt 130, by motor 131. It will further be understood that the tucking devices 36, 39, and 50 are actuated through one cycle when clutch 114 is engaged, the engagement of this clutch mechanically coupling shaft 115 to the driving chain 112, which chain is driven (FIG. 14) from the creasing roller system.

The over-all cycle of operations is now discussed.

Referring to the block diagram (FIG. 13) of the principal electrical components, there is provided a first photosensitive control and signaling device 19. This device detects that a work unit 18 is appropriately positioned in the machine for processing, and it then initiates the processing of such work unit. This processing consists of these steps: cutting off the trailing edge of the work unit, pleating or forming it into an accordion form, and finally double cross-folding it. The device 19 detects, by reflected light, a reference mark on the border of the blueprint supply 16, and then initiates a sequence of operations now described.

Preparatory to cutting off the trailing edge of the work unit, the feeding rollers and the creasing rollers are stopped by their brakes 55 and 45, respectively. The creasing rollers are stopped only for a very brief period sufficient for the cutting operation, but the feeding rollers remain stopped until the pleating operation on that work unit has been completed. Accordingly, there is provided a relay 155 which is independently coupled to the driving motor 56 for the feeding and creasing rollers, and to the creasing roller brake 45, in such a way that when relay 155 is energized it interrupts the power circuit to the driving motor 56 and applies the creasing roller brake 45. Additionally, relay 155 is coupled to the cutter actuator 57 by a relay 65, and it closes contacts in relay 65 to energize the cutter actuator. The cutter actuator is in turn provided with a limit switch 58 which opens to de-energize relays 155 and 65 upon the completion of the cutting operation. Relay 155 is referred to in the claims as the "second relay means responsive to the first photosensitive means (19) for applying the creasing roller brake (45) and de-energizing the source of motive power (56) and actuating the cutter (via 65 and 57)." There is also provided a relay 54 which is coupled to and controls an electromagnetic brake 55 which stops the feed rollers prior to the performance of the cutting operation. Relay 54 is referred to in the claims as a "first relay means responsive to the first photosensitive means (19) for applying the feeding roller brake (55)."

Therefore it will be seen that when photosensitive signaling device 19 detects the reference mark on the blueprint, the machine functions in this manner: (1) the drive 56 is de-energized; (2) the feed roller brake 55 is applied; (3) the creasing roller brake 45 is applied; and (4) the print is cut.

The first three functions are performed substantially simultaneously, and then the work unit is severed from the supply.

The driving motor 56 and the creasing rollers are stopped only long enough for the cutting operation to be performed, and that is the reason why limit switch 58 is interposed between the cutter actuator 57 and the relay 155 in such a manner as to de-energize that relay as well as relay 65 upon the completion of the cutting operation. Parenthetically, the switch 58 is referred to in the claims as "means responsive to actuation of the cutter means for resetting the second relay means (155) to energize the source of motive power (56) and to release the creasing roller brake (45)."

For the reasons stated, the first relay means 54 may be thought of as a device which "tells" or orders the brake 55 to stop the feeding rollers and to keep them stopped until the pleating operation is completed. The second relay means 155 may be thought of as a device which "tells" or orders the driving motor 56 and the creasing rolls to stop when the trailing edge of a work unit is to be cut off, and to start when the severance of that work unit is completed. It also "tells" or orders the cutter actuator 57 to perform the cutting operation.

Having recounted the events which occur upon the initiation of the processing of a work unit, the discussion now proceeds to the actual processing, and it will conclude with the events occurring at the end of such processing.

The work unit 18 is compressed between the creasing rollers 27 and 28 to form the alternate folds of an accordion, and it is secured in accordion form by the stacking device on tray 33. Making reference now to FIG. 2, it will be seen that as long as a work unit is interposed between light source 35 and a second photosensitive signaling device 34, there is no light on that signaling device. The second signaling device 34 senses the completion of the pleating operation because the work unit is no longer so interposed. The second photosensitive signaling device then initiates two sets of operations, the first of which is cross-folding, and the second of which is restarting the feed rollers in order to position a new work unit in the machine.

That is to say, as the first cross-folding operation is made on the first work unit, the feeding of the second work unit is initiated as soon as the creasing rolls are appropriately positioned to accept it. Parenthetically, the preferred embodiment of the invention is so arranged and timed that the second cross-folding operation is made on the work unit preceding the one here designated as the "first" work unit for purposes of describing the operations, at the same time as the first cross-folding operation is made on the first work unit.

The cross-folding system (elsewhere described in detail herein) is brought into a cycle of operation by a folder actuator 46. That is, when the folder actuator 46 is energized, the cross-folding operations are initiated. Actuator 46 is energized when the following conditions are fulfilled: (1) Processing of the first work unit has been ordered by energizing of the first relay means 54 in the manner described above, relay means 54 being provided with an output which sets up a control circuit in a relay 66; (2) The second photosensitive signaling device 34 sends signals, via closed contacts in relay 61, to the control circuit in relay 66, which, being set up, then energizes the folder actuator 46.

The cross-folding mechanism goes through one complete cycle when actuator 46 is energized, the actuator closing a single revolution clutch for that purpose. The cross-folding system includes a limit switch 67, which at the bottom of its stroke causes relay 66 to be energized, thereby de-energizing the folder actuator 46. It will be seen from the foregoing that relay 66 is a relay means which, when de-energized, responds to the action of energized relay 54 and signaling device 34 (via de-energized relay 61) to initiate the cross-folding operations. Relay 66 further responds to the closing of limit switch 67 to become energized and then to start a sequence of events which causes a new work unit to be fed into the machine.

Relay 66 is therefore a device which "tells" the cross-folding system to operate and, upon the completion of such operation, establishes the sequence of events required for the feeding of a new work unit into the machine.

The feeding of the second work unit is controlled by a relay 61. Relay 61 is energized by relay 66 when limit switch 60 is closed, and this limit switch closes when the creasing drums are in a position such that they will properly receive a new work unit, if the feeding rolls are restarted. The cross-folding mechanism 39 is associated with an arming switch 154 which is closed only when the cross-folding mechanism is in its position of rest, and this switch 154 is included in circuit between limit switch 60 and relay 66 to assure that the cross-folding arms are in the rest position when the feeding of a new work unit into the machine begins.

When relay 61 is energized these events occur: (1) Its own holding circuit is established; (2) The feeding roller clutch 62 is closed; outputs from relay 61 cause relays 66 and 54 to be de-energized, and, when relay 54 is de-energized, it releases the feed roller brake 55 so that the feed rolls are engaged to supply the second work unit into the creasing rolls. In summary, we have seen that when the second photosensitive device 34 is energized, the first work unit is folded and deposited in slide 49, while a preceding work unit already in slide 49 is cross-folded for the second time. Further, the feed rolls are engaged to drive the second work unit into the creasing rolls. When the leading edge of the second work unit interrupts light passing from source 35 to photosensitive device 34, relay 61 is de-energized and the feed roller clutch 62 is opened, so that the feed rollers go into a free-wheeling condition and remain in that condition until the reference mark 14 near the leading edge of the third work unit registers with the first signaling device 19, whereupon another cycle of operations is initiated.

Relays 61 and 66 are referred to in the claims as "third relay means actuated by the second photosensitive means (34) for closing the clutch (62) and for resetting the first relay means (54) to restart the feeding rollers."

The description of certain of the elements of the system is now amplified. Referring particularly to the slack take-up device illustrated in FIGS. 11 and 12, it comprises idler rollers 24 and 25 and a gravitationally positioned roller 26 which is mounted on a shaft 140, movable vertically up and down in guide slots such as 141 provided in a mounting frame 142, 147. The blueprint supply passes over roller 24, then under roller 26, and then over roller 25, and the operation is such that roller 26 is raised when slack decreases and lowered when slack increases. This action is automatic. Swingably mounted at 143 is an arm 148 which positions a gear 144. Gear 144 in turn meshes with a spur gear 145 to control the adjustment of the slack take-up control potentiometer 146 (FIGS. 11 and 13), and this potentiometer automatically controls the speed of motor drive 56 (FIGS. 1 and 13) in such a manner as to prevent excessive slack. To illustrate, a slack increase is indicated by depression of roller 26 and counter-clockwise swing of arm 148, adjusting potentiometer 146 to increase the speed of the variable motor drive 56. This action occurs when the blueprint folding machine is not "keeping up with" the blueprint supply machine 15. On the other hand, let it be assumed that the blueprint supply machine slows down. In that case, the roller 26 is lifted, positioning arm 148 in such a manner as to cause the motor drive 56 to decrease in speed, thus maintaining the desired synchronism between the blueprint supply machine 15 and our novel blueprint folding machine.

Also in accordance with the invention, there are provided start switch 136 and stop switch 135 (FIGS. 11 and 13). When power is turned on, print material is supplied at 16 to the folding machine, and the slack take-up roller 26 depresses. When it reaches a position at which arm 118 actuates start switch 136, motor drive 56 (FIGS. 1 and 11) is energized and the folding machine starts. This operation assures that some slack will be present when the folding machine starts. In the event that the blueprint supply machine 15 stops, the roller 26 is elevated until arm 148 closes a stop switch 135, and this switch is so arranged as to stop the drive 56 in that event. The drive 56 cannot restart until the slack take-up roller 26 lowers to the point at which the start switch 136 is again closed. The slack take-up device of FIGS. 11 and 12 is disclosed and claimed in our U.S. patent application Serial No. 49,812, filed October 1, 1961, entitled "Blueprint Folding Machine," which is a division of our aforementioned patent application Serial No. 859,360 and also assigned to the same assignee as the present application and invention.

Further amplifying mechanical details of the invention, reference is now made to the cutter, which is shown in FIGS. 8, 9, and 10. The cutting is performed by a wire 160 which is fixedly suspended at one end by a suitable mounting 161. The other end of the cutting wire is moved across the paper by reason of its connection to a link 132, which is pivotally mounted at 133 for actuation by a thrust element 134 which is driven by the cutter-actuating solenoid 57 (FIGS. 9 and 13). The cutter is positioned generally as indicated in FIG. 2, wire 160 being located in front of a descending run of blueprint supply 16.

Still amplifying the mechanical details, reference is now made to the creasing rollers specifically shown in FIGS. 3, 4, and 5. The creasing means 28 and 27 comprise, respectively, hollow cylindrical drum-carrying members 72 and 71. Positioned on member 72 are spaced drums (preferably five), all of which are shown in FIG. 1, and three of which are shown in FIG. 5 and numbered 73, 74, and 75. Each of these drums is formed with a web such as 76 secured to member 72, an annular rim 77, and a rubber tread 78. Tube 71 is similar to tube 72 and likewise carries five drums.

The work unit is creased or bent in one direction by a continuous metallic blade or projection 79, secured to member 72 and extending completely across the width of the print. A blade 80 is similarly provided on the cooperating creasing roller and secured to the member 71, in order to alternately crease or bend the work unit in the opposite direction. Blade 80 is spaced from member 71 by a plurality of spacing means 81, 82, and 83. Blade 79 is secured to member 72 in similar fashion. Blade 80 is secured to the webs by adjustable locating means 93, and blade 79 is similarly located by suitable means 94.

Each of the creasing rollers is also provided with a depression, located diametrically opposite to the projecting blade. In creasing means 27, the depression is formed by a continuous elastic rubber strip member 87, extending completely across the drums and across the width of the entire work unit. This strip is backed up by an elastic rubber base 88, secured in position by channel members 89 and a bottom support 90, both extending axially of the creasing roller. The support 90 is positioned in place by spacers generally indicated at 91, and is secured to the webs by angle members 95. Creasing means 28 is similarly provided with a rubber strip 97, rubber base 98, and like parts for positioning the same.

In operation, blade 79 compresses the work unit 18 against strip 87 and base 88, and the latter elastically depress so that the work unit is formed in a "convergence left" direction, as illustrated in FIGS. 17 and 18. Similarly, the blade 80 compresses the work unit against strip 97 and base 98 to crease the work unit in a "convergence right" direction, as illustrated in FIGS. 19 and 20.

Referring again to FIGS. 3–5, the hollow tubes 71 and 72 are secured to suitable shafts. Tube 72, for example, is secured to shaft 70 by plugs 100 and 101, and these plugs position sprockets 102 and 103, which are secured to and rotate with the shaft in order to drive the stacking belts 104 and 105 (FIG. 1) which drive the stacking mechanism. Keyed to shaft 70 is a gear 106 (FIG. 5), which drives a similar gear 107 (FIG. 1) for the creasing roller 27.

Another feature of the machine provides insurance against imprinted material being accordion folded indefinitely without the occurrence of a cutting operation. The feed rollers are arranged to drive a footage-counter roller 170 (FIG. 2) which closes a counter switch 171 once per revolution. In normal operation, the first photosensitive signaling device 19 responds to the presence of the reference mark 14 and actuates the cutter, and counter 171 and associated circuitry are arranged simply to "stand by." However, in the event that a cutting operation does not occur after a predetermined amount of travel of supply 16 and the generation of a predetermined number of pulses by counter 171, suitable circuitry associated with counter 171 actuates the cutter via cutter actuator 57.

Normal operation of photosensitive signaling device 19 resets this counter, so that the ultimate effect of the counter is to fix a limit on the amount of print material that passes into our folding machine without being cut off.

The counter, upon the generation of a predetermined number of pulses, actuates relay 54 and produces the same results as would the normal response of the signaling device 19 to a reference mark 14. The counter 171 therefore assures that relay 54 will be actuated. If relay 54 is not actuated by a signal from device 19, then, after a predetermined amount of travel of supply 16, counter 171 assures that the relay 54 will be actuated. This amount of travel is, of course, greater than the distance between marks 14.

From the foregoing description, it will be seen that, in accordance with the invention, there is provided a machine for receiving a continuous blueprint supply 16 and forming sheets of said blueprint into accordion-pleated and double cross-folded units. The double cross-folded units are deposited in delivery tray 51. This machine comprises a pair of feeding rollers 21, 22 extending transversely of the supply for leading out and positioning a work unit 18; a tray 33; and a pair of creasing rollers 28 and 27 above said tray for creasing a given sheet while feeding it in loose accordion form into said tray. One of the creasing rollers, numbered 28, is formed with a first longitudinal depression 97 and a first diametrically opposed longitudinal projection 79, and the other of the creasing rollers, 27, is formed with a second longitudinal projection 80 and a second diametrically opposed longitudinal depression 87, so that the sheet is compressed between the first projection and the second depression to make the first alternate folds of the accordion form, each of which folds converges in one direction, and so that the sheet is compressed between the second projection and the first depression to make the second alternate folds of the accordion form, each of which folds converges in the opposite direction. The accordion form is stacked and positioned on the tray by a pair of spaced stacking rollers 85, 86, said stacking rollers being formed with first and second groups of resilient wipers such as 32 located on opposite sides of the tray. The machine further includes means 104 and 105 for driving the stacking rollers so that the groups of wipers engage and bend over opposite folds of the accordion form as the sheet is deposited on the tray 33, together with deflecting means 127, 128 for leading the leading edge of the work unit under the first group of wipers so that the second group can secure the first fold of the accordion. Following this the groups of wipers alternate in securing the alternate folds of the accordion form in a defined stack. The deflecting means 127, 128 comprises a spaced pair of pivotally mounted rods extending diagonally upwardly and across the tray 33, and these rods swing into parallelism with the tray after leading said edge under the first group of wipers. The invention also includes cutter means 17 for severing the trailing edge of the work unit from the supply, a source of motive power 56 for the feeding rollers and creasing rollers, a clutch 62 between that source and the feeding rollers, a brake 55 for the feeding rollers, and a brake 45 for the creasing rollers.

The electrical system of this machine includes a first photosensitive means 19 for determining when a work unit is in position to be severed from the supply, a first relay means 54 responsive to the first photosensitive means for applying the feeding roller brake 55, a second relay means 155 responsive to the first photosensitive means 19 for applying the creasing roller brake 45 and de-energizing the source of motive power 56 and energizing the cutter 17 via the cutter actuator 57. The system further includes means 58 responsive to actuation of the cutter for resetting the second relay means 155 to energize the source of motive power 56 and release the creasing roller brake 45. The system includes a second photosensitive means 34 which is de-energized during the pleating operation to open the feed roller clutch 62, and third relay means 61, 66 actuated by the second photosensitive means 34 for closing clutch 62 and resetting the first relay means 54 to restart the feeding rollers. The invention further includes first cross-folding means 36, 39, and second cross-folding means 50 actuated through a clutching device 114 by reason of the operation of the second photosensitive means 34 for double cross-folding the accordion and depositing the ultimate work product into the tray 51. Limit switch means 60 renders the actuation of the third relay means dependent on a predetermined position of the creasing rollers.

While there has been shown and described what is at present believed to be the preferred embodiment of the invention, it will be understood by those skilled in the art that various changes and modifications may be made therein without departing from the true scope of the invention as defined by the appended claims.

We claim:

1. A machine for receiving a continuous blueprint supply and transforming predetermined portions thereof into pleated and double cross-folded blueprint units, comprising:
   a pair of feeding rollers extending transversely of the supply for leading out and positioning a work unit;
   a plurality of creasing means extending transversely of the work unit for forming the same into a pleated accordion;
   cutter means for severing the trailing edge of the work unit from the supply;
   a source of motive power for the feeding rollers and creasing means;
   a clutch between said source and the feeding rollers;
   a brake for the feeding rollers;
   a brake for the creasing means;
   a first photosensitive means for determining when a work unit is in position to be severed from the supply;
   first relay means responsive to said first photosensitive means for applying the feeding roller brake;
   second relay means responsive to said first photosensitive means for applying the creasing roller brake and de-energizing the source of motive power and energizing the cutter;
   means responsive to actuation of the cutter means for resetting the second relay means to energize the source of motor power and release the creasing roller brake;
   a tray for receiving the pleated accordion from the creasing means;
   a second photosensitive means which is de-energized during the pleating operation to open said clutch;
   third relay means actuated by the second photosensitive means for closing said clutch and resetting the first relay means to restart the feeding rollers;
   first and second cross-folding means actuated by the second photosensitive means for double cross-folding the accordion;
   and limit switch means for rendering the actuation of the third relay means dependent on a predetermined position of the creasing means.

2. A machine for receiving a continuous blueprint supply and transforming predetermined portions thereof into pleated and double cross-folded blueprint units, comprising:
   a pair of feed rollers extending transversely of the supply for leading out and positioning a work unit;
   a first photosensitive means for sighting a reference mark on the work unit to determine when the trailing edge of a work unit is in position to be severed from the supply;
   a pair of creasing rollers each comprising ganged creasing-drums extending transversely of the work unit for forming the same into a pleated accordion, the creasing rollers having projections and complementary elastic depressions for bending and reverse-bending the work unit;
   cutter means actuated by the first photosensitive means for severing the work unit from the supply;
   first brake means actuated by the first photosensitive means for stopping the feed rollers preparatory to such cutting;
   means comprising idler rollers and a take-up roller for taking up slack between the supply and the feed rollers;
   second brake means actuated by the first photosensitive means for instantaneously arresting the creasing rollers preparatory to such cutting;
   a tray for receiving the pleated accordion;
   a second photosensitive means for indicating the completion of the pleating operation;
   clutch means actuated by the second photosensitive means for restarting said feed rollers;
   and cross-folding means actuated by the second photosensitive means for double cross-folding the accordion.

3. A machine for forming a blueprint sheet into a pleated and double cross-folded unit, comprising:
   means for feeding a sheet and means for severing its trailing edge from a continuous supply,
   means extending transversely of the sheet for forming the same into a pleated accordion,
   means for indicating the completion of the pleating operation,
   means actuated by said indicating means for cross-folding the accordion,
   and means responsive to said indicating means for actuating the first-mentioned means for feeding.

4. A machine in accordance with claim 3 in which the feeding means includes intermittently operated feed rolls,
   supply means for continuously supplying blueprint to said feed rolls,
   slack in the blueprint being supplied developing when said rolls are accepting blueprint at a lesser rate than the supply rate,
   and means for taking up said slack.

5. A machine in accordance with claim 4 and means responsive to increase and decrease of slack for increasing and decreasing, respectively, the speed of said feed rolls.

6. In a blueprint folding machine, the combination of:
   creasing means for forming a work unit into an accordion,
   means including feed rollers for supplying blueprint to the creasing means,
   motor means for driving said feed rollers and said creasing means,
   a clutch between the driving motor and the feed rollers,
   a brake for the feed rollers,
   a brake for the creasing means,
   a first light-sensitive means for indicating that the leading edge of a second work unit is approaching the feeding means,
   first relay means responsive to said first light-sensitive means for applying the feed roller brake,
   second relay means responsive to said first light-sensitive means for applying the brake for the creasing means and disabling the motor,
   cutting means responsive to the second relay means for severing the first work unit,
   and means responsive to the action of the cutting means for resetting the second relay means.

7. The combination in accordance with claim 6, and means controlled by the first light-sensitive means for keeping said clutch open during the time that a work unit in process is being formed into an accordion,
the creasing means drawing the work unit through the machine during that time.

8. The combination in accordance with claim 7, a second light-sensitive means for indicating the completion of said forming,
and third relay means actuated by the second light-sensitive means for closing said clutch and resetting the first relay means.

9. The combination in accordance with claim 8,
a cross-folding mechanism,
and means controlled by the second light-sensitive means for actuating said cross-folding mechanism.

No references cited.